(12) United States Patent
Yeh et al.

(10) Patent No.: US 7,136,121 B2
(45) Date of Patent: Nov. 14, 2006

(54) RGB RESINS COVERING THE BLACK MATRIX AND FILLING THREE CONTIGUOUS APERTURE, EACH JOINTING ADJACENT RESINS AND FORMING A CONTINUOUS FLAT SURFACE

(75) Inventors: Sheng-Shiou Yeh, Miao-Li (TW); Jia-Pang Pang, Miao-Li (TW)

(73) Assignee: Innolux Display Corp., Miao-Li (TW)

( * ) Notice: Subject to any disclaimer, the term of this patent is extended or adjusted under 35 U.S.C. 154(b) by 40 days.

(21) Appl. No.: 10/821,358

(22) Filed: Apr. 9, 2004

(65) Prior Publication Data
US 2004/0201798 A1    Oct. 14, 2004

(30) Foreign Application Priority Data
Apr. 9, 2003    (TW) ................ 92108168 A

(51) Int. Cl.
*G02F 1/1335*    (2006.01)
(52) U.S. Cl. .................... 349/106; 349/110; 349/111; 349/137
(58) Field of Classification Search ........ 349/106–109, 349/110, 111, 137
See application file for complete search history.

(56) References Cited

U.S. PATENT DOCUMENTS

| | | | | |
|---|---|---|---|---|
| 4,853,296 | A | * | 8/1989 | Fukuyoshi ............... 428/623 |
| 5,850,271 | A | * | 12/1998 | Kim et al. ................ 349/111 |
| 6,285,424 | B1 | | 9/2001 | Yoshida |
| 6,740,457 | B1 | * | 5/2004 | Takizawa ..................... 430/7 |

* cited by examiner

*Primary Examiner*—Andrew Schechter
*Assistant Examiner*—Lucy Chien
(74) *Attorney, Agent, or Firm*—Wei Te Chung

(57) ABSTRACT

A method for manufacturing a color filter (30) includes: preparing a transparent substrate (34); forming a black matrix (33) on the transparent substrate, the black matrix including an antireflection layer (332) formed on the transparent substrate and a light-shielding layer (333) formed on the antireflection layer, the antireflection layer including a first antireflection film (3321) having a first index of refraction, and a second antireflection film (3322) having a different second index of refraction, the black matrix defining a plurality of apertures arranged in an array; and coating a color resin layer (32) on the transparent substrate and the black matrix.

3 Claims, 2 Drawing Sheets

US 7,136,121 B2

RGB RESINS COVERING THE BLACK MATRIX AND FILLING THREE CONTIGUOUS APERTURE, EACH JOINTING ADJACENT RESINS AND FORMING A CONTINUOUS FLAT SURFACE

BACKGROUND OF THE INVENTION

1. Field of the Invention

The invention generally relates to methods of manufacturing color filters and associated liquid crystal display (LCD) devices.

2. The Prior Art

In general, a monochrome or a color LCD device has the advantages of thinness, light weight and low power consumption. For this reason, LCD devices are widely used in various types of electronic equipment, from pocket calculators to large-scale office automation equipment.

Conventionally, a color LCD device includes a color filter at a position opposite to a liquid crystal layer. The color filter has three kinds of color (red, green and blue—RGB) resins separated by a black matrix having a plurality of apertures. The visibility of the LCD device mainly depends upon the characteristics of the black matrix of the color filter.

The basic structure of a conventional color filter is shown in FIG. 4. The color filter 20 includes a transparent substrate 24 with a black matrix 23 deposited thereon, the black matrix 23 defining a plurality of apertures (not labeled) therein. RGB color resins 22 are filled in the apertures of the black matrix 23 in a sequential repeating pattern. The RGB color resins 22 filter light beams passing therethrough, thus producing respective RGB color light beams.

The black matrix 23 functions as a light-shielding mask, to improve the contrast ratio of an LCD device using the color filter 20. In particular, the black matrix 23 increases the OD (Optical Density, i.e. light-shielding) value, and reduces optical reflectivity of the top and bottom surfaces thereof. However, the black matrix 23 is conventionally made from a metal whose optical reflectivity is too high, or is made from a resin whose OD value is too low. Thus, modified color filters have been developed to solve the above-described problems.

Referring to FIG. 5, a color filter as described in U.S. Pat. No. 6,285,424 issued on Sep. 4, 2001 is illustrated. The color filter 1 comprises a black matrix 9 formed on a transparent substrate 2. The black matrix 9 comprises a first antireflection film 3, a second antireflection film 4 and a metal screening film 5 formed one on top of the other in that order. The antireflection films 3, 4 are made of different kinds of metallic compounds having mutually different compositions. At least one of the films 3, 4, 5 contains chromium (Cr). In addition, RGB color resins are separately filled in apertures of the black matrix 9. A protective layer 6 and a conductive layer 7 are sequentially formed on the RGB color resins and the black matrix 9. The protective layer 6 functions as a layer flattening the color filter 1, and as an insulator.

In manufacturing of the color filter 1, firstly, the black matrix 9 having a plurality of apertures is formed on the transparent substrate 2 using exposing and developing technology. Then the RGB color resins are repeatedly and respectively filled in the apertures of the black matrix 9, so that every three adjacent apertures have three different color resins and cooperatively define a pixel. Then the protective layer 6 is formed on the RGB color resins and the black matrix 9, to provide an even outer surface for the color filter 1.

The multi-layer antireflection structure of the black matrix 9 can decrease the optical reflectivity of the surface thereof adjacent the transparent substrate 2. However, the optical reflectivity of the other surface thereof opposite to the transparent substrate 2 is still generally too great. That is, the optical reflectivity of the outer surface of the metal screening film 5 is too great. When the black matrix 9 is used in an LCD device, back light beams are reflected by the outer surface of the metal screening film 5 to an excessive degree. This creates light interference, which reduces the visibility of the LCD device.

Therefore, it is desired to obtain a color filter with low reflectivity on both surfaces thereof, and to obtain an LCD device incorporating such color filter.

SUMMARY OF THE INVENTION

A main object of the present invention is to provide a method for manufacturing a color filter with low reflectivity on both of main surfaces thereof.

According to one aspect of the present invention, a preferred method for manufacturing a color filter comprises: preparing a transparent substrate; forming a black matrix on the transparent substrate, the black matrix comprising an antireflection layer formed on the transparent substrate and a light-shielding layer formed on the antireflection layer, the antireflection layer comprising a first antireflection film having a first index of refraction, and a second antireflection film having a different second index of refraction, the black matrix defining a plurality of apertures arranged in an array; and coating a color resin layer on the transparent substrate and the black matrix.

Other objects, advantages, and novel features of the present invention will become more apparent from the following detailed description when taken in conjunction with the accompanying drawings, in which:

DESCRIPTION OF THE PREFERRED EMBODIMENTS

Figure 1:
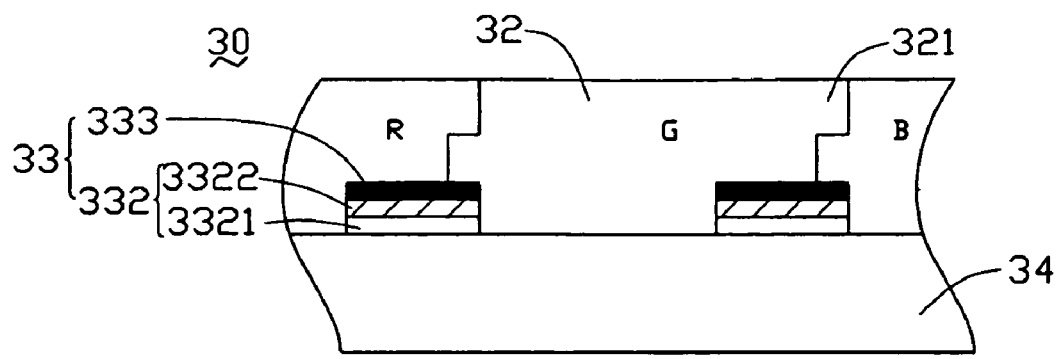
FIG. 1 is a schematic, cross-sectional view of a part of a color filter obtained according to a preferred first embodiment of a method of the present invention.

The preferred first embodiment of the method for manufacturing a color filter according to the present invention will be described with reference to FIG. 1. The color filter is designated with the numeral 30, and the method comprises three basic steps (1), (2), (3) as detailed below:

(1) Preparing and cleaning a transparent substrate 34. The transparent substrate 34 is a flat transparent glass.

(2) Forming a black matrix 33 on the transparent substrate 34. First, a first antireflection film 3321 and a second antireflection film 3322 are sequentially formed on the transparent substrate 34. The two antireflection films 3321, 3322 combined together act as an antireflection layer 332, and respectively have a first index of refraction and a different second index of refraction. For example, the first refraction index may be less than the second refraction index. In addition, the two antireflection films 3321, 3322 preferably have thicknesses in the ranges from 20 to 60 nm and from 20 to 100 nm respectively. Further, the two antireflection films 3321, 3322 are preferably made principally from chromium oxide ($CrO_X$, X denoting the ratio of the number of atoms of O to the number of atoms of Cr) and chromium nitride ($CrN_Y$, Y denoting the ratio of the number of atoms of N to the number of atoms of Cr) respectively. A light-shielding layer 333 is made principally from chromium, and has an index of refraction less than the second refraction index of the second antireflection film 3322.

The first antireflection film 3321 is formed using a reactive sputtering method. That is, the transparent substrate 34 is placed in a chamber (not shown), and a metal or alloy is placed as a target substrate (not shown) at a position opposite to the transparent substrate 2. The pressure in the chamber is reduced to a first pressure P1 (or less, if required), and argon gas as an inactive gas (rare gas) is introduced into the chamber. A reactive gas (at least any one of oxygen gas, nitrogen gas, and carbon dioxide gas, or a mixture thereof) to be reacted with a metal of the target substrate (Cr, Mo, W, Ni, or Ge) is introduced into the chamber, and the pressure in the chamber is held at a second pressure P2. The temperature of the transparent substrate 34 is monitored and held at a first temperature T1, while a first sputtering power W1 is applied to the target substrate to generate plasma. Thus, the metal of the target substrate is subjected to sputtering. The reaction between the sputtered metal atoms or molecules and the reactive gas introduced into the chamber results in the formation of the first antireflection film 3321 on the transparent substrate 34.

The second antireflection film 3322 is also formed using a reactive sputtering method. That is, the second antireflection film 3322 is formed as follows. After the formation of the first antireflection film 3321, without taking the transparent substrate 34 out of the chamber, the gas in the chamber is evacuated until the pressure in the chamber becomes a third pressure P3 or less. Argon gas as an inactive gas (rare gas) is introduced into the chamber. Further, a reactive gas (at least any one of oxygen gas, nitrogen gas, and carbon dioxide gas, or a mixture thereof) to be reacted with a metal of target (Cr, Mo, W, Ni, or Ge) is introduced into the chamber, and the pressure in the chamber is held at a fourth pressure P4. The temperature of the transparent substrate 34 is monitored and held at a second temperature T2, while a second sputtering power W2 is applied to the target substrate to generate plasma. Thus, the metal of the target substrate is subjected to sputtering. The reaction between the sputtered metal atoms or molecules and the reactive gas introduced into the chamber results in the formation of the second antireflection film 3322 on the first antireflection film 3321.

Second, the light-shielding layer 333 is formed on the antireflection layer 332. The light-shielding layer 333 functions as a mask that shields light. The light-shielding layer 333 is formed as follows. After the formation of the second antireflection film 3322 of the antireflection layer 332, the gas in the chamber is evacuated until the pressure in the chamber becomes a fifth pressure P5 or less. Argon gas is introduced into the chamber until the pressure in the chamber becomes a sixth pressure P6. The temperature of the transparent substrate 34 is monitored and held at a third temperature T3, while a third sputtering power W3 is applied to the target substrate to generate plasma. Thus, the metal (Cr, Mo, W, Ni, or Ge) of the target substrate is subjected to sputtering. The sputtered metal atoms or molecules are deposited on the second antireflection film 3322, resulting in the formation of the light-shielding layer 333. The light-shielding layer 333 and the antireflection layer 332 in combination define the black matrix 33 having a plurality of apertures, as seen in FIG. 1.

It is noted that the first antireflection film 3321, the second antireflection film 3322, and the light-shielding layer 333 may be formed using a CVD (chemical vapor deposition) method or a vacuum evaporation method, instead of using the above-described sputtering method.

Next, a positive photo resist layer is coated onto the outer surface of the light-shielding layer 333, followed by pre-baking. The photo resist layer is irradiated with light, so that a pattern having a plurality of apertures therein to be photosensitized is transferred onto the photo resist layer. The photosensitized region of the photo resist layer is dissolved using a solvent; that is, the photosensitized region is developed. Post-baking is carried out, thereby forming a photo resist layer having a plurality of apertures in the light-shielding layer 333.

Further, using the photo resist layer as a mask, an etchant is applied to the light-shielding layer 333, the second antireflection film 3322 and the first antireflection film 3321 immediately under the apertures of the photo resist layer. A contact area is thus etched. After the completion of etching, the photo resist layer is removed from the top of the screening film 333 using a solvent, thereby forming the black matrix 33 having a plurality of apertures. It is noted that, in the manufacturing of the black matrix 33 having the above-described structure, it is preferable to use an etchant mainly composed of ammonium cerium (IV) nitrate. In such case, it is possible to etch the light-shielding layer 333, the second antireflection film 3322 and the first antireflection film 3321 at the same time.

(3) Coating a color resin layer 32 on the transparent substrate 34 and the black matrix 33. There are two main sub-steps required to form the color resin layer 32. That is, a first color resin sub-layer (not labeled) is formed on the transparent substrate 34 and the black matrix 33, and then a second color resin sub-layer (not labeled) is formed on the first color resin sub-layer. The first and second color resin sub-layers together constitute the color resin layer 32. As seen in FIG. 1, the color resin layer 32 comprises adjacent regions of red (R), green (G) and blue (B) resin. The red, green and blue resins are positive color resins containing appropriate respective pigments. Each region adjoins an adjacent region at a same side of a corresponding light-shielding layer 333. Each two adjoining color regions are lapped one over the other above part only of the light-shielding layer 333.

The first color resin sub-layer is formed on the transparent substrate 34 and the black matrix 33 as follows. A blue resin is coated onto the black matrix 33 from a dispenser disposed above the transparent substrate 34, so that the blue resin is charged in all the apertures of the black matrix 33. The transparent substrate 34 coated by the blue resin is subjected to pre-baking, thereby forming a blue resin layer having a uniform height above the transparent substrate 34. It is noted that the transparent substrate 34 may be rotated about a rotation axis running along its thickness, so that the height of the blue resin layer above the transparent substrate 34 is uniform prior to pre-baking.

Then, a first full exposure is performed using a photo mask. All the blue resin is removed using a solvent, except for blue resin remaining on regions corresponding to every third aperture in each row and in each column of the black matrix 33 array. Each remaining blue resin region overlies more than half of a corresponding light-shielding layer 333 at one side thereof, and overlies less than half of another corresponding light-shielding layer 333 at an opposite side thereof.

Next, a green resin is coated onto the black matrix 33 so that the green resin is charged in all vacant apertures of the black matrix 33. Then a first full exposure is performed using the same photo mask. All the green resin is removed using a solvent, except for green resin remaining on regions corresponding to every third aperture in each row and in each column of the black matrix 33 array. Each remaining green resin region overlies more than half of a corresponding light-shielding layer 333 and adjoins a blue resin region at one side thereof, and overlies less than half of another corresponding light-shielding layer 333 at an opposite side thereof.

After that, a red resin is coated onto the black matrix 33 so that the red resin is charged in all vacant apertures of the black matrix 33. That is, the red resin is disposed in regions corresponding to every third aperture in each row and in each column of the black matrix 33 array. Each red resin region overlies more than half of a corresponding light-shielding layer 333 and adjoins a green resin region at one side thereof, and overlies less than half of another corresponding light-shielding layer 333 and adjoins a blue resin region at an opposite side thereof. Thus, the contiguous R, G, and B resin regions cooperatively form the first color resin sub-layer, which is continuous, flat and smooth.

The second color resin sub-layer is formed on the first color resin sub-layer in similar fashion to the above-described procedures for forming the first color resin sub-layer on the transparent substrate 34 and the black matrix 33. The same photo mask as that used in the forming of the first color resin sub-layer is used. The R, G, and B resin regions of the second color resin sub-layer substantially correspond to but are slightly offset from the R, G, and B color resin regions of the first color resin sub-layer. With this configuration, an overlapping part 321 of each color resin region in the second color resin sub-layer is only located above a corresponding light-shielding layer 333, and does not interfere with the corresponding adjacent pure color aperture of the black matrix 33. The offset, contiguous R, G, and B resin regions cooperatively form the second color resin sub-layer, which is continuous, flat and smooth. Thus, the first and second color resin sub-layers cooperatively form the continuous, plane color resin layer 32.

The coating of the color resin layer 32 on the transparent substrate 34 and the black matrix 33 can be performed by an alternative method to the above-described two main sub-steps. The alternative method also comprises two main sub-steps. In the first sub-step, contiguous R, G, and B color resin regions of the color resin layer 32 are formed, except that each R, G, and B color resin region is missing the overlapping part 321. In the second sub-step, the voids corresponding to the overlapping parts 321 are charged with the corresponding R, G, and B color resins, so that the above-described configuration of R, G, and B color resin regions of the color resin layer 32 are formed. Thus the continuous, plane color resin layer 32 is formed.

The above-described method for manufacturing the color filter 30 utilizes conventional sub-procedures, but does not require the formation of an extra layer to provide a flat outer surface of the color filter 30. A plane outer surface of the color filter 30 is attained without the need for the extra layer. Thus the cost of manufacturing the color filter 30 is reduced.

Figure 2:
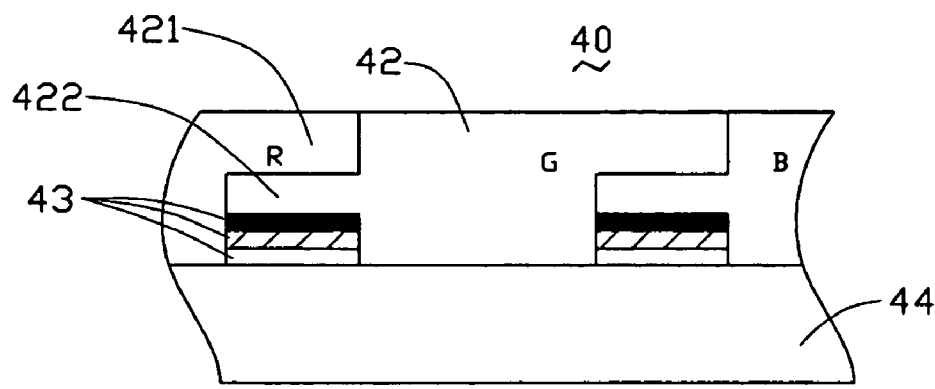
FIG. 2 is a schematic, cross-sectional view of a part of a color filter obtained according to a preferred second embodiment of a method of the present invention.

The preferred second embodiment of the method for manufacturing a color filter according to the present invention will be described with reference to FIG. 2. The color filter is designated with the numeral 40, and the method is substantially similar to the preferred first embodiment of the method for manufacturing the color filter 30 described above. A black matrix 43 is formed on a transparent substrate 44. Two overlapping parts 421, 422 of two adjoining color resin regions cover the entire light-shielding layer of a corresponding portion of the black matrix 43. That is, the overlapping parts 421, 422 are lapped one on the other on an entire area of said portion of the black matrix 43, unlike in the color filter 30 where the lapping occurs only on a part of the corresponding portion of the black matrix 33.

Figure 3:
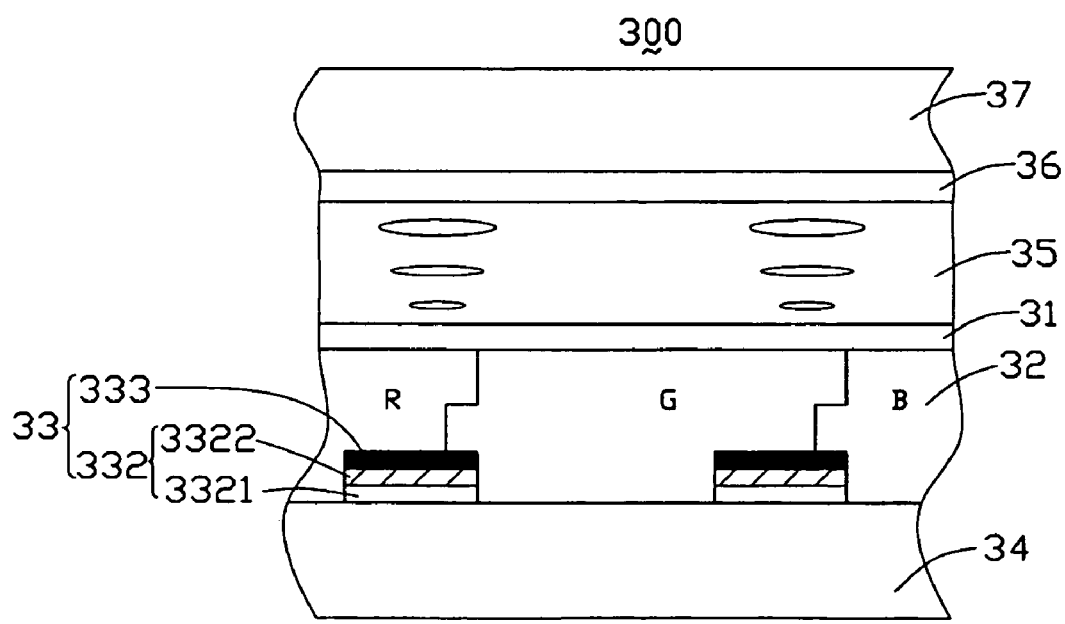
FIG. 3 is a schematic, cross-sectional view of a part of an LCD device incorporating the color filter of FIG. 1.
Figure 4:
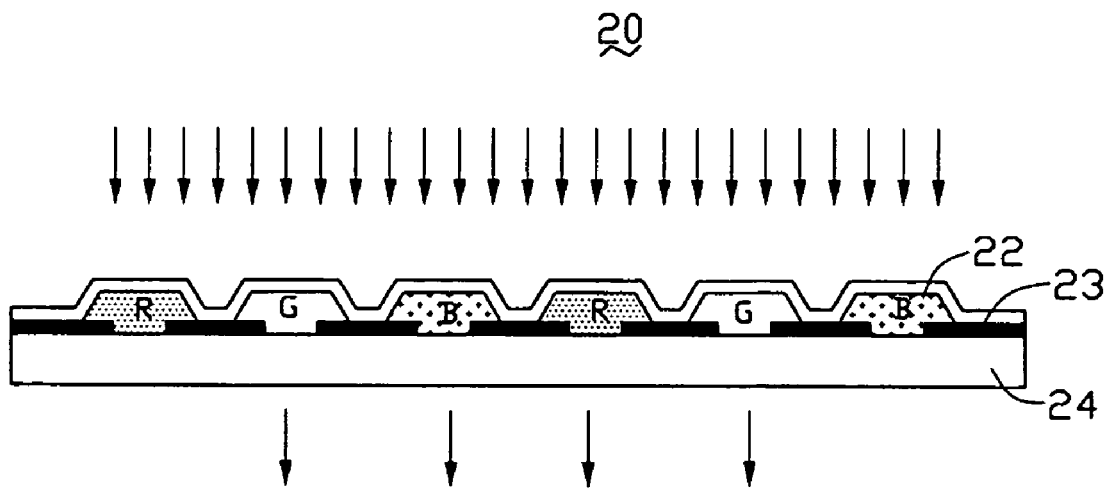
FIG. 4 is a schematic, cross-sectional view of a part of a conventional color filter.
Figure 5:
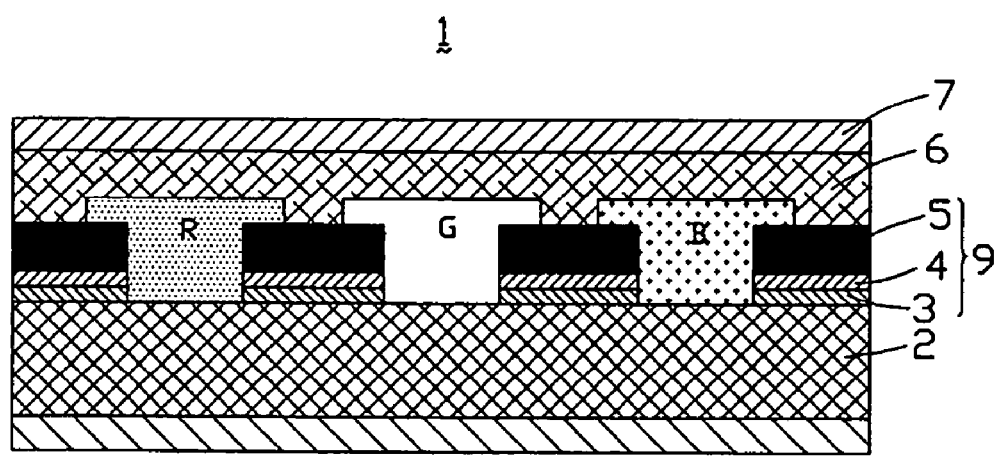
FIG. 5 is a schematic, cross-sectional view of a part of another conventional color filter.

A preferred method for manufacturing an LCD device having the color filter 30 in accordance with the present invention will be described with reference to FIG. 3.

The LCD device is designated with the numeral 300, and the method comprises the steps of: (1) manufacturing the color filter 30, and forming an ITO (Indium Tin Oxide) layer 31 on the color resin layer 32; (2) manufacturing an electrode substrate 37 having a TFT (Thin Film Transistor) layer 36 formed on an inner surface (not labeled) thereof, and forming a cavity between the ITO layer 31 and the TFT layer 36; and filling a liquid crystal layer 35 in the cavity. Alternatively, step (2) can be performed before step (1).

In operation of the LCD device 300, the TFT and ITO layers 31, 36 are connected with an IC (Integrated Circuit) device (not shown) to control rotation of liquid crystal molecules in the liquid crystal layer 35, and thereby control the passage or blocking of light beams. Back light beams emitted by an illuminator (not shown) pass through the electrode substrate 37 and the TFT layer 36 of the LCD device 300, and enter the liquid crystal layer 35. Most of the light beams pass through the liquid crystal layer 35, are filtered by the color resin layer 32 of the color filter 30, and emit from an outer surface (not labeled) of the transparent substrate 34. A remainder of the light beams pass through the liquid crystal layer 35, but are blocked by the black matrix 33.

It is known that an optical reflectivity of the color resin layer 32 is lower than that of the light-shielding layer 333 made from chromium. Therefore the light beams impinging on an outer surface of the light-shielding layer 333 of the black matrix 33 are mostly absorbed by the color resin layer 32 rather than being reflected by the light-shielding layer 333. Thus the phenomenon of light interference is diminished. That is, the OD value of the black matrix 33 is increased, and the visibility of the LCD device 300 is improved. In addition, the two antireflection films 3321, 3322 of the black matrix 33 can reduce optical reflection of external light. Therefore, the color filter 30 has low reflectivity on both surfaces thereof. Accordingly, the LCD device 300 using the color filter 30 provides high brightness and contrast.

It is to be understood, however, that even though numerous characteristics and advantages of the present invention have been set forth in the foregoing description, together with details of the steps and associated structures of the invention, the disclosure is illustrative only, and changes may be made in detail, especially in matters of arrangement of procedures and related objects within the principles of the invention to the full extent indicated by the broad general meaning of the terms in which the appended claims are expressed.

The invention claimed is:

1. A method for manufacturing a color filter, comprising:
preparing a transparent substrate;
forming a black matrix having a plurality of apertures on the substrate, the black matrix comprising an antireflection layer formed on the transparent substrate and a light-shielding layer formed on the antireflection layer; and
coating a color resin layer comprises on the transparent substrate and the black matrix, wherein the color resin layer comprises RGB (red, green, blue) resins, the RGB resins respectively fill each three contiguous apertures, and each of the RGB resins comprises joint portions jointing adjacent resins, and the joint portions are lapped one over the other above corresponding portions of the black matrix,
wherein the RGB resins cooperatively form a continuous, flat surface opposite to the transparent substrate.

2. A method for manufacturing a liquid crystal display device, comprising:
preparing a transparent substrate;
forming a black matrix having a plurality of apertures on the substrate;
coating a color resin layer on the transparent substrate and the black matrix, wherein the color resin layer comprises RGB (red, green, blue) resins, the RGB resins respectively fill each three contiguous apertures, and each of the RGB resins comprises joint portions jointing adjacent resins, and the joint portions are lapped one over the other above corresponding portions of the black matrix, and the RGB resins cooperatively form a continuous, flat surface opposite to the transparent substrate;
forming an ITO (Indium Tin Oxide) layer on the color resin layer;
providing an electrode substrate having a TFT (thin film transistor) layer formed on an inner surface thereof, and forming a cavity between the ITO layer and the TFT layer; and
filling a liquid crystal layer in the cavity.

3. The method as claimed in claim 2, wherein at least one of the joint portions of each of the RGB resins is lapped above a whole surface of the corresponding portion of the black matrix.

* * * * *